(12) United States Patent
Poland et al.

(10) Patent No.: US 7,379,631 B2
(45) Date of Patent: May 27, 2008

(54) MULTI-CORE DISTRIBUTED TEMPERATURE SENSING FIBER

(75) Inventors: Stephen H. Poland, Blacksburg, VA (US); Daniel S. Homa, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/451,207

(22) Filed: Jun. 12, 2006

(65) Prior Publication Data

US 2007/0286561 A1    Dec. 13, 2007

(51) Int. Cl.
*G02B 6/00* (2006.01)
*G01J 1/04* (2006.01)

(52) U.S. Cl. .......................... 385/12; 385/37; 385/123; 385/126; 250/227.11; 250/227.14; 250/227.18

(58) Field of Classification Search ................ 385/125, 385/126, 127, 128, 12, 37, 13, 123; 250/227.14, 250/227.13, 227.16, 227.18, 227.23, 227.26, 250/227.11
See application file for complete search history.

(56) References Cited

U.S. PATENT DOCUMENTS

| | | | |
|---|---|---|---|
| 4,443,698 A | | 4/1984 | Schiffner |
| 5,563,967 A | * | 10/1996 | Haake .......................... 385/12 |
| 6,285,446 B1 | * | 9/2001 | Farhadiroushan ........... 356/35.5 |
| 6,301,420 B1 | * | 10/2001 | Greenaway et al. ........ 385/126 |
| 6,389,187 B1 | | 5/2002 | Greenaway et al. |
| 6,807,324 B2 | * | 10/2004 | Pruett .......................... 385/12 |
| 2006/0013523 A1 | | 1/2006 | Childers et al. |
| 2006/0115204 A1 | * | 6/2006 | Marsh et al. ................. 385/12 |
| 2007/0110355 A1 | * | 5/2007 | Jaaskelainen et al. ......... 385/12 |

OTHER PUBLICATIONS

U.S. Appl. No. 11/448,475, filed Jun. 7, 2006.

* cited by examiner

*Primary Examiner*—Brian M. Healy
(74) *Attorney, Agent, or Firm*—Cantor Colburn LLP

(57) ABSTRACT

A multi-core distributed temperature sensing optical fiber is described, wherein the arrangement and construction of at least two cores provides a spectral attenuation corrected (e.g., corrected for hydrogen and/or stress on the fiber) temperature measurement.

9 Claims, 2 Drawing Sheets

MULTI-CORE DISTRIBUTED TEMPERATURE SENSING FIBER

BACKGROUND

A common problem with distributed temperature systems (DTS) (e.g., utilizing Raman DTS fibers) involves difficulties in making calibrated temperature measurements. Single-ended DTS measurements can only be calibrated with assumptions on the spectral-dependent loss characteristics of the optical fiber. Effects of hydrogen and stress on the fiber may change spectral-dependent losses in the fiber. Any changes to spectral-dependent loss require that temperature calibration points are included along the length of the sensing fiber, which can be particularly difficult to implement in certain applications (e.g., downhole configurations).

Furthermore, calibration points have very limited benefit if the spectral dependent loss is non-linear (location dependent). In the case of non-linear spectral attenuation, one accepted solution is to deploy a DTS sensing fiber in a dual-ended configuration, which, when interrogated from both directions by a DTS system on the surface, can be used to correct for errors due to non-linear spectral attenuation. To date, the primary technique to achieve a dual-ended DTS configuration has been to use two capillary lines (which may be, e.g., around ¼ inch in outer diameter) and a U-tube at the bottom that connects the two capillary lines, and then to pump an optical fiber along the entire length of the tubing (in the case of downhole applications, from the surface to bottom hole and back to the surface). However, this approach adds to the complexity of a completion (versus having only one capillary tube) and can also significantly increase the fluid pressures that are required to pump the DTS fiber/cable over the entire length of tubing.

What is needed is a DTS system with improved accuracy and without a U-tube configuration with dual capillary tube lines (such that installation costs and complexity of the system are reduced, along with reduced risk that the DTS fiber does not traverse the capillary lines).

Furthermore, where fiber Bragg grating (FBG) based distributed temperature sensing fibers are utilized, it must be recognized that such fibers are cross-sensitive to strain. While cabling techniques may be used to reduce strain imparted in FBG-based DTS fibers, completely removing strain and/or preventing changes in strain imparted to an optical fiber during and after deployment is difficult, if not impossible. What is also needed in the art is a FBG temperature sensing fiber having improved strain corrected temperature readings taken from the Bragg gratings.

Optical fiber temperature sensors, particularly those utilized in harsh environments, such as in downhole environments, are also predominantly plagued by temperature changes and drift sources. Thus, where measurement is attempted, additional sensors have been required to attempt to compensate for such temperature changes, and drift of the measurement. For example, two pressure sensors might be employed near each other having different sensor characteristics (i.e., different responses to the undesired parameter), and calculations may be made in an attempt to eliminate the effect of the parameter on the measurement (effectively in an attempt to isolate the parameter of interest, e.g., temperature effects at the point of interest).

While this may appear to be a good solution, conditions at the two sensors must be exact to accurately eliminate the influences of the undesired parameter. Also, the need to set up and run multiple sensors at every measurement point of interest can be tedious and costly.

What is also needed in the art is a simple, low cost solution to providing strain and drift source corrected temperature measurements in optical fiber sensors.

SUMMARY

The above-described and other problems and deficiencies of the prior art are overcome and alleviated by the presently described multi-core distributed temperature sensing optical fiber, wherein the arrangement and construction of at least two light guiding cores provides a spectral attenuation corrected (e.g., corrected for hydrogen and/or stress on the fiber) temperature measurement. In one exemplary embodiment, the optical fiber comprises at least two cores, wherein the cores have collocated measurement portions, for example, in-fiber interferometers or Bragg grating portions. In another exemplary embodiment, one core comprises a Raman DTS fiber, e.g., a 50 micron core, 62.5 micron core, 100 micron core, etc., or a Ge-doped singlemode core with fiber Bragg gratings written periodically or randomly therein. In another exemplary embodiment, a second core comprises an additional Raman DTS fiber core or singlemode core with fiber Bragg gratings.

In an exemplary embodiment, the fiber is arranged such that the cores respond differently to temperature and/or strain changes at a point of interest. For example, the cores may be doped differently such that the measurement portions within the core (e.g., fiber Bragg gratings) react differently between at least two cores. In one embodiment, at least two cores are differently doped and each include fiber Bragg gratings, such that the wavelength of a fiber Bragg grating in one core either does not shift, or shifts differently, with regard to a fiber Bragg grating in a second core in response to a change in an environmental parameter (e.g., strain on the fiber).

The above-discussed and other features and advantages of the presently described multi-core optical fiber DTS sensor will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

Figure 1:
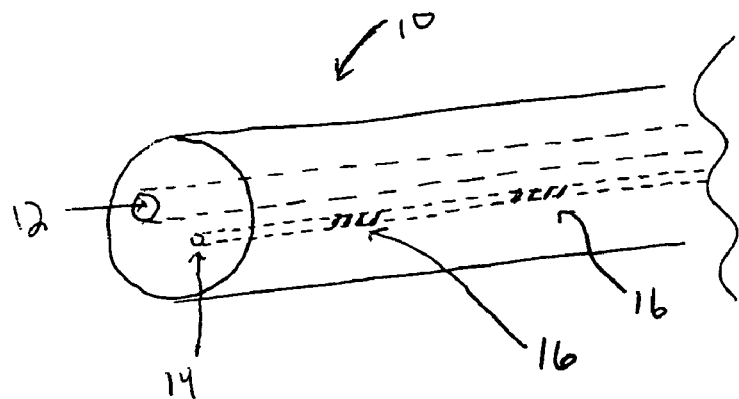
FIG. 1 is a perspective view of an exemplary multi-core fiber utilizing a Raman DTS core and a singlemode core with fiber Bragg gratings.

Referring now to FIG. 1, an exemplary multi-core optical fiber is illustrated generally at 10. The fiber comprises a first light guiding core 12 and a second light guiding core 14. In the illustrated exemplary embodiment, the first core 12 is a Raman distributed temperature sensing (DTS) core, which core may be of any convenient size, e.g., 50 micron core, 62.5 micron core, 100 micron core, etc. The second core 12 is illustrated as a singlemode core including fiber Bragg gratings.

Figure 2:
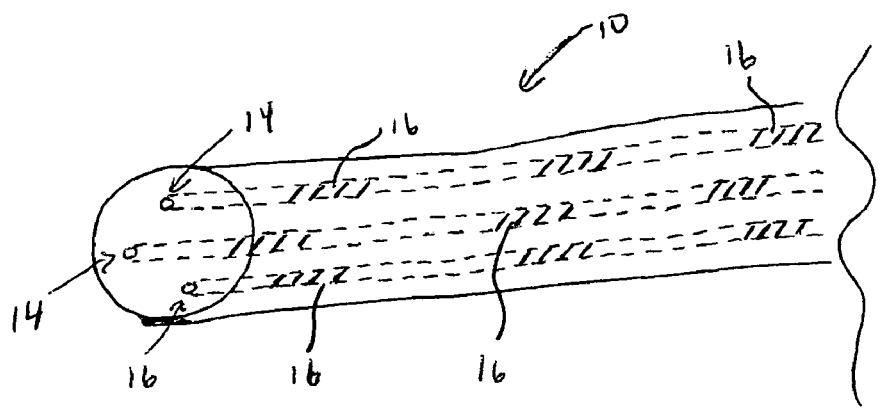
FIG. 2 is a perspective view of an exemplary multi-core fiber utilizing a plurality of singlemode cores with fiber Bragg gratings.

Referring now to FIG. 2, another exemplary embodiment utilizes at least two light guiding cores (3 such cores are illustrated here), wherein the cores include fiber Bragg gratings 16 written periodically or randomly therein. In one exemplary embodiment, the fiber Bragg gratings 16 of at least two cores are generally collocated, and the measured effects of temperature or strain at a particular location are compared to correct for non-linear spectral attenuation. With regard to FIG. 3, it is to be noted that for purposes of this disclosure, the term "at least two light guiding cores" should be construed to encompass a construction wherein multiple core portions 12 lie parallel in the same length of fiber cable, even where two such cores 12 are joined, e.g., at a distal (or downhole) portion, as shown generally at 17 in FIG. 3. With regard to FIG. 1, it should also be noted that the cores need not have the same diameters, e.g. with a single mode core having a lesser diameter than a Raman DTS core positioned within the same fiber.

As used herein, the multiple core fibers improve the accuracy of a DTS measurement of the fiber. Also, where at least two cores are engineered to react differently to a desired parameter, e.g., temperature (which temperature may vary considerably in downhole environments) or strain (which may arise due to cabling construction, activity, vibration, etc. in the environment), the measurements from the at least two cores may be compared to ascertain a corrected temperature measurement.

For example, one (primary) core may be constructed as a Ge-doped core with fiber Bragg gratings, and a second (temperature correcting) core may be co-doped with Ge and Boron (note that these dopings are merely exemplary, and e.g., Phosphorous or other elements or combinations of elements may be used to provide the cores with differential reactions). In such construction (see e.g., the construction of FIG. 2), the fiber Bragg grating wavelengths in the correcting core either will not shift or will shift differently or with changes in temperature, thereby allowing strain-induced temperature measurement errors to be estimated and removed from temperature measurements made with the fiber Bragg gratings in the primary core.

By way of another example, a first (primary) core may be a Raman DTS core, and a second (correcting) core may be a singlemode core that is co-doped with Ge and Boron (or Phosphorous, etc.) so that the fiber Bragg grating wavelengths in the correcting core do not shift or shift differently with temperature. In this case, the fiber Bragg gratings in the correcting core could measure strain, which could be used to compensate from stress-induced spectral-dependent losses. It is noted that the correcting core may be either of a Raman DTS core and a singlemode core with fiber Bragg gratings. Similarly, the primary core may be either of a Raman DTS core and a singlemode core with fiber Bragg gratings.

Figure 4:
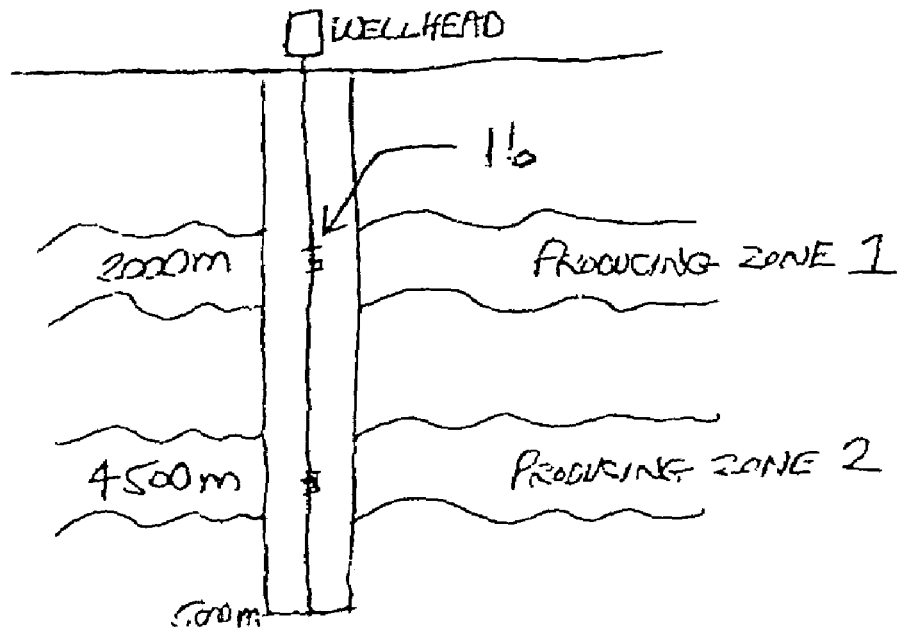
FIG. 4 is a schematic view of a downhole DTS measurement system including a fiber utilizing collocated gratings.
Figure 5:
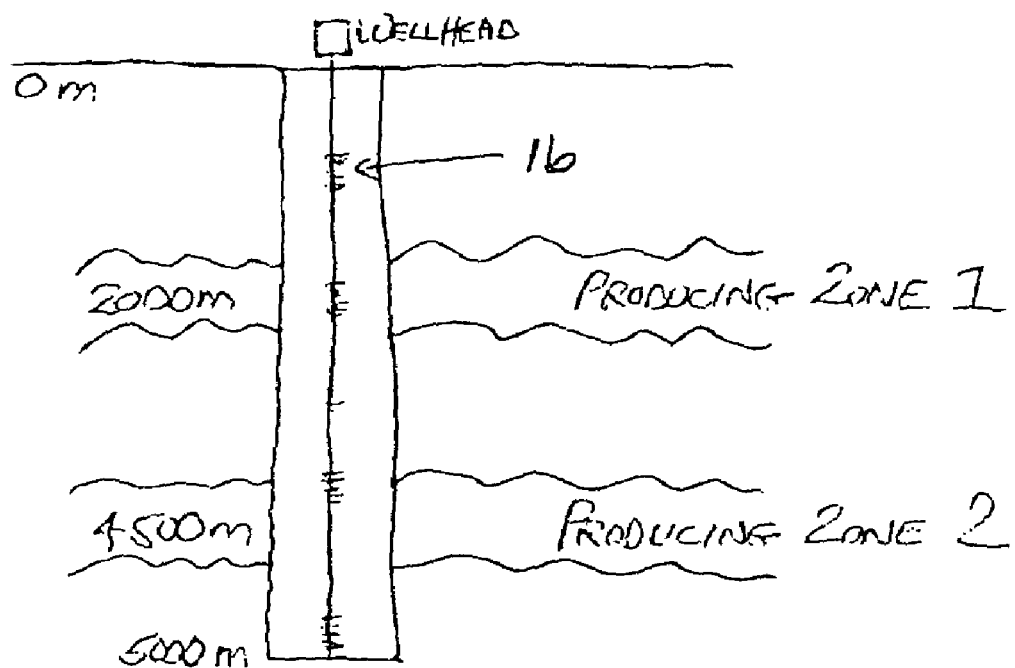
FIG. 5 is a schematic view of a downhole DTS measurement system including a fiber utilizing collocated gratings at defined intervals.

In another exemplary embodiment, an improved DTS system includes a single-core fiber (which may be, e.g., a 50/125 micron multimode refractive index profile fiber or a fiber that can produce a sufficient level of Raman scattering intensity for the distributed temperature measurements), including grating sets written at certain intervals, or a multi-core fiber wherein collocated gratings or grating sets are written into the cores at specific locations along the fiber length (For example, the gratings 16 may correspond to producing zones within an oil/gas well, as illustrated in FIG. 4, where such producing zones are located at 2000 meters and 4500 meters beneath the wellhead, respectively. Alternately, such gratings 16 may be written at prescribed distances, e.g., 500 meters, 1000 meters, etc. along the fiber, as illustrated in FIG. 5). Where grating sets are written, a high density of gratings may be written at each grating set in order to produce a strong grating reflection. Furthermore, each grating set may be written at a disparate wavelength, which wavelengths are not in conflict with Stokes or anti-Stokes wavelengths (e.g., 1451 and 1663 nanometers for a 1550 nanometer pump).

The discrete grating wavelengths can be written via multiple phase masks on the drawing tower via various methods. One exemplary method includes use of a rotating wheel that contains multiple (e.g., 5 or 6) masks around its perimeter. This grating wheel would be rotated during the draw run to write gratings at discrete wavelengths.

The DTS temperature system described immediately above then may calibrate itself at a predetermined, periodic frequency (e.g., hourly, daily, weekly). Such calibration involves polling the grating sets or collocated gratings at these predetermined times. The absolute temperature of each grating set is then calculated via its wavelength shift. The distributed Raman temperature measurements are then adjusted via these regional temperature measurements, which are not affected by loss increases. A tunable laser or a high-power broadband source can be employed to poll the grating sets. The gratings may be written at wavelengths that are less susceptible to loss increases, such as around the 1310 nanometer window or around 1500 nanometers (e.g., 1495, 1500, 1505 nanometers). The grating sets may also be written around 1000 nanometers, but this window may be more susceptible to SWE loss increases.

By way of the above, such a DTS temperature system may determine the loss increases of the fiber core(s) at various regions along the fiber to significantly improve the accuracy of DTS measurements.

Figure 3:
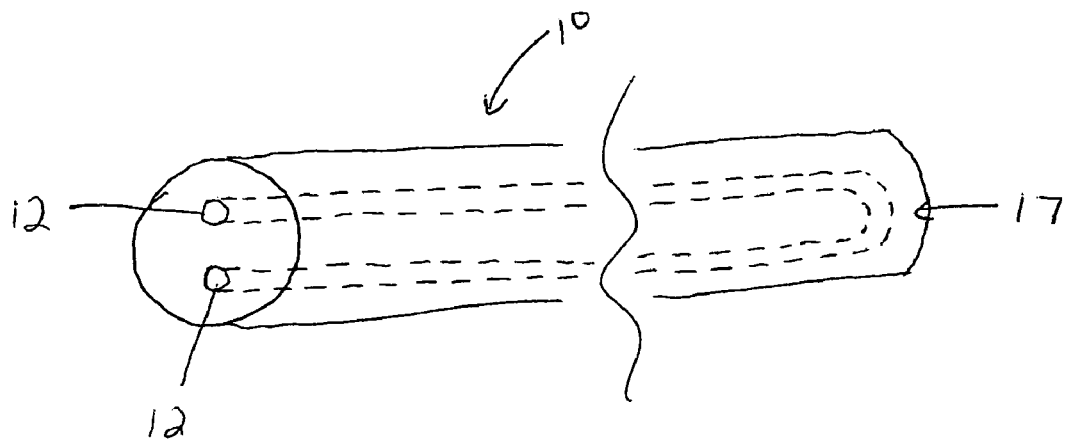
FIG. 3 is a perspective view of an exemplary multi-core fiber utilizing two Raman DTS cores connected at a distal end.

In another exemplary embodiment, the ends of two cores are connected at a distal end of an optical fiber (see region 17 in FIG. 3). In such case, the cores provide a calibrated temperature measurement when each of the cores is interrogated in both directions by a DTS system provided at only one end of the multi-core fiber. It should be noted that this is the case even for non-linear (or location dependent) spectral attenuation.

It will be apparent to those skilled in the art that, while exemplary embodiments have been shown and described, various modifications and variations can be made to the embodiments disclosed herein without departing from the spirit or scope of the invention. Accordingly, it is to be understood that the various embodiments have been described by way of illustration and not limitation.

What is claimed is:

1. A multi-core distributed temperature sensing fiber, comprising:
    an optical fiber connected to a temperature sensing means, the optical fiber comprising at least two light guiding cores, wherein the at least two light guiding cores are connected at a distal end of said optical fiber.

2. A multi-core distributed temperature sensing fiber in accordance with claim 1, wherein said at least two light guiding cores are configured to permit interrogation through said cores in either direction by a distributed temperature sensing system positioned solely at a proximal end of said optical fiber.

3. A multi-core distributed temperature sensing fiber in accordance with claim 2, wherein said at least two light guiding cores comprise Raman distributed temperature sensing optical fiber cores.

4. A multi-core optical fiber distributed temperature sensing optical fiber system, comprising:
 a distributed temperature sensing system measurement light source; and
 at least two light guiding cores, said at least two light guiding cores constructed to respond differently to temperature or strain changes at a point of interest, wherein measurement portions of said at least two light guiding cores correspondingly provide differential optical responses to interrogation by said measurement light source, wherein a first light guiding core has a first Bragg grating written at a first wavelength therein and a second light guiding core has a second Bragg grating written at said first wavelength therein, and wherein said first and second cores have a different sensitivity to wavelength.

5. A multi-core optical fiber distributed temperature sensing optical fiber system in accordance with claim 4, wherein said at least two optical fiber cores are differentially doped.

6. A multi-core optical fiber distributed temperature sensing optical fiber system in accordance with claim 5, wherein one of said cores is doped with a first dopant or dopant mix and includes at least one fiber Bragg grating, and wherein a second of said cores is doped with a second dopant or dopant mix and includes at least one fiber Bragg grating, such that the fiber Bragg grating wavelengths in said second core does not shift or shifts differently in response to temperature changes relative to the fiber Bragg grating wavelengths in said first core.

7. A multi-core optical fiber distributed temperature sensing optical fiber system in accordance with claim 6, wherein said first dopant is Germanim and wherein said second dopant is Germanium and Boron.

8. A multi-core optical fiber distributed temperature sensing optical fiber system in accordance with claim 4, wherein said at least two cores include collocated gratings written into the cores at predetermined locations along the length of the optical fiber.

9. A multi-core optical fiber distributed temperature sensing optical fiber system in accordance with claim 8, wherein the system calibrates itself periodically by polling said collocated gratings at the predetermined locations to calculate the absolute temperature of said locations according to wavelength shift.

* * * * *